July 21, 1931.  J. H. O'NEIL ET AL  1,815,522
AUTOMATIC CAN TESTING MACHINE
Filed July 12, 1927    7 Sheets-Sheet 1

Inventors
James H. O'Neil
George F. Loor
By Sturtivant Mason
Attorneys

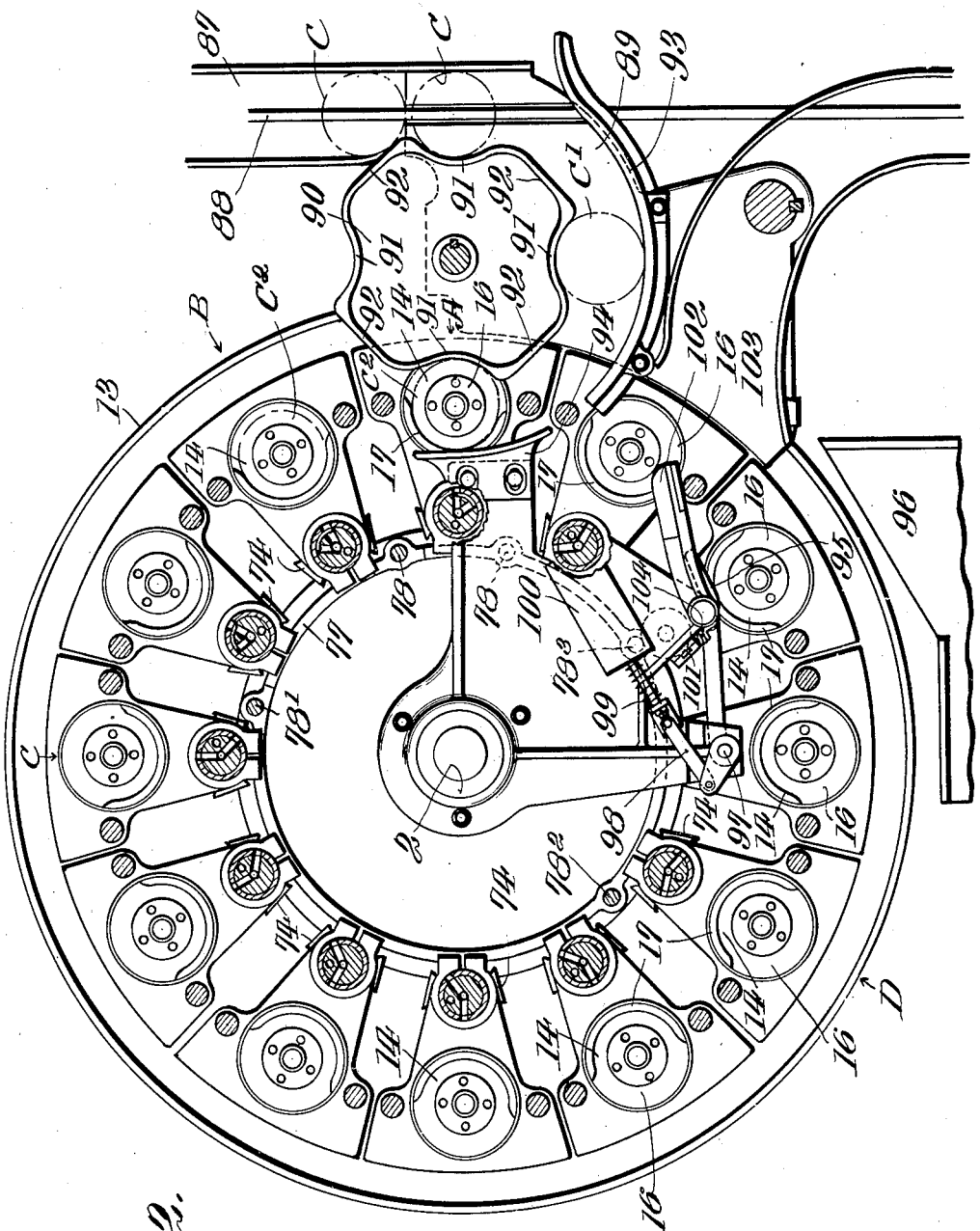

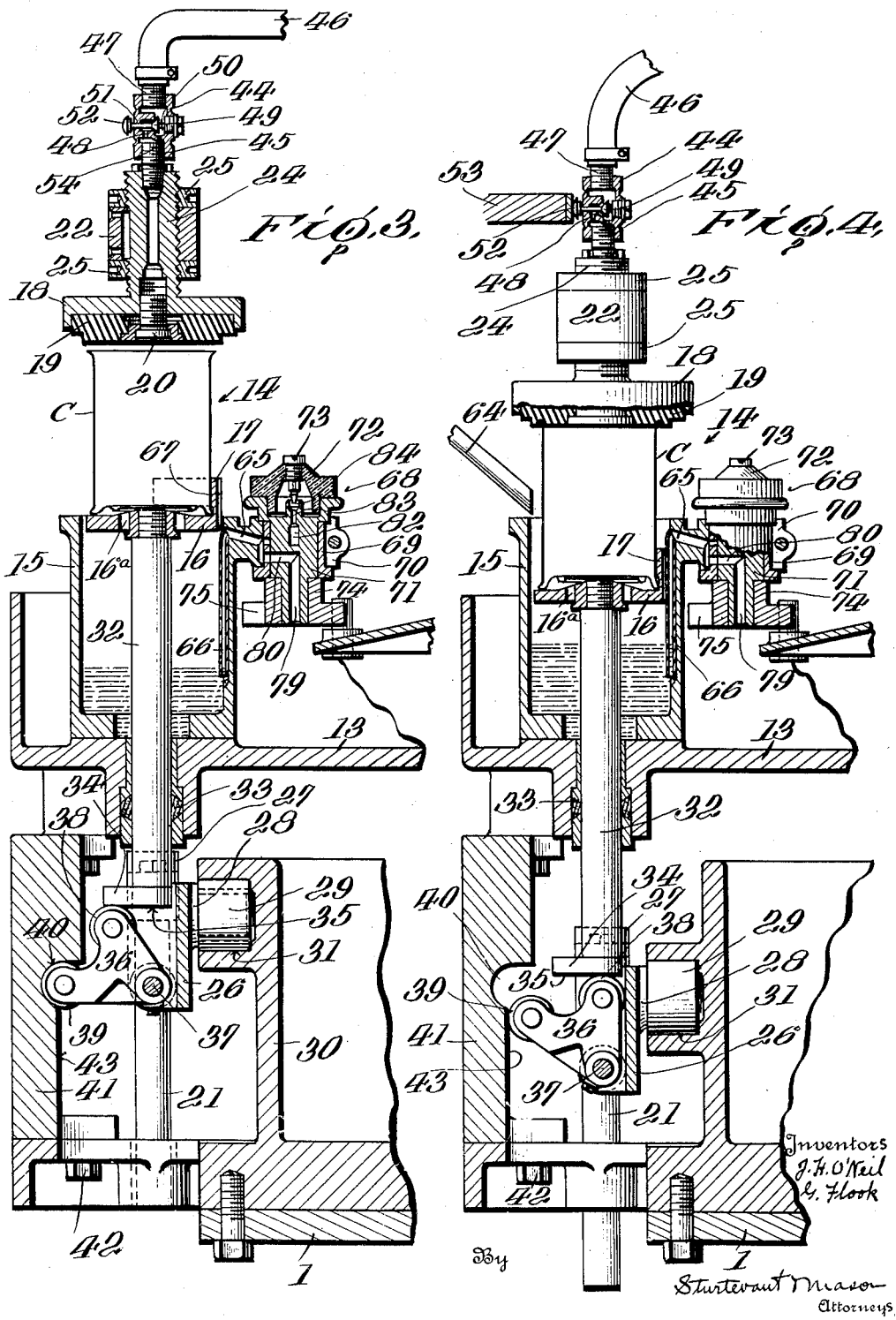

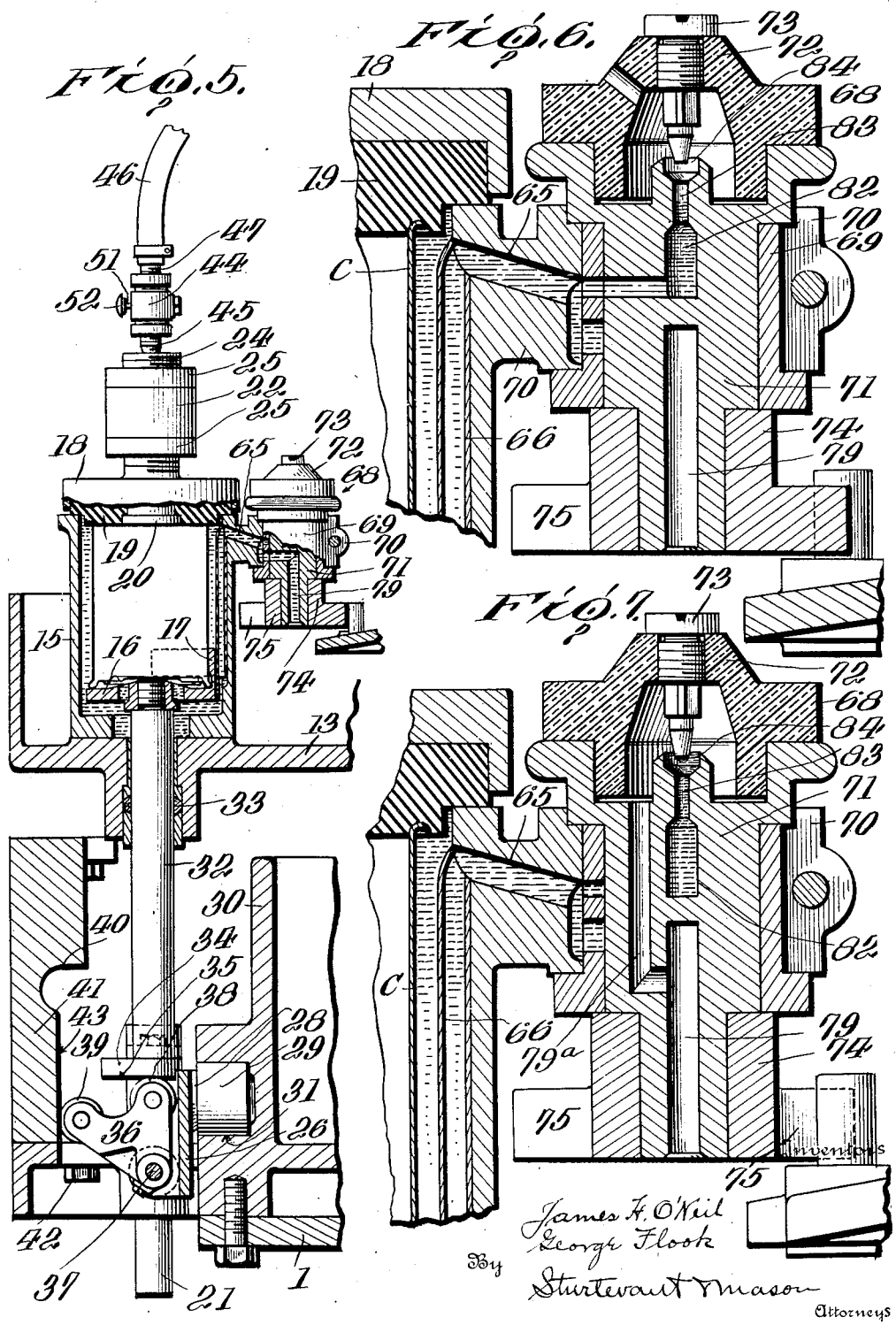

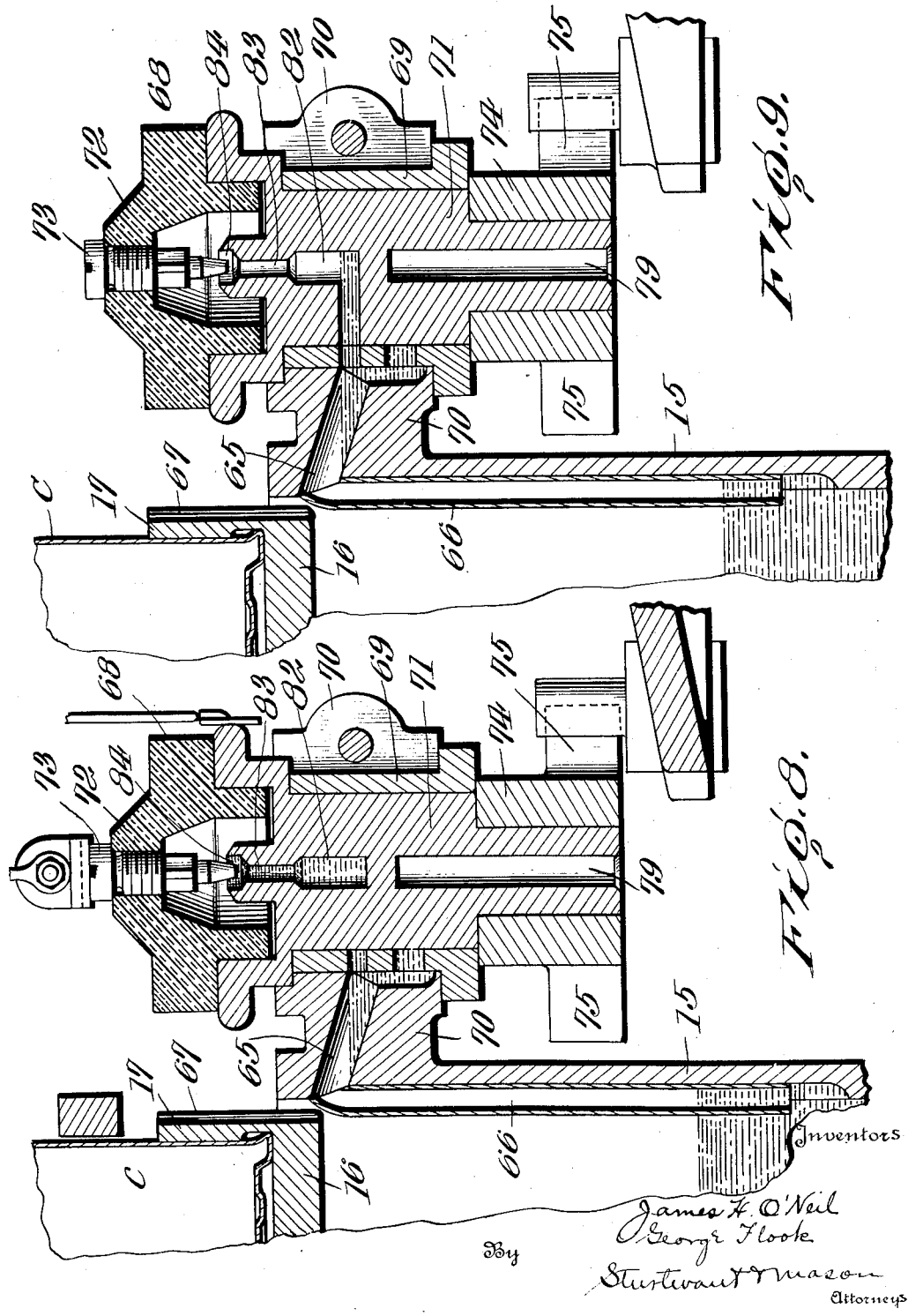

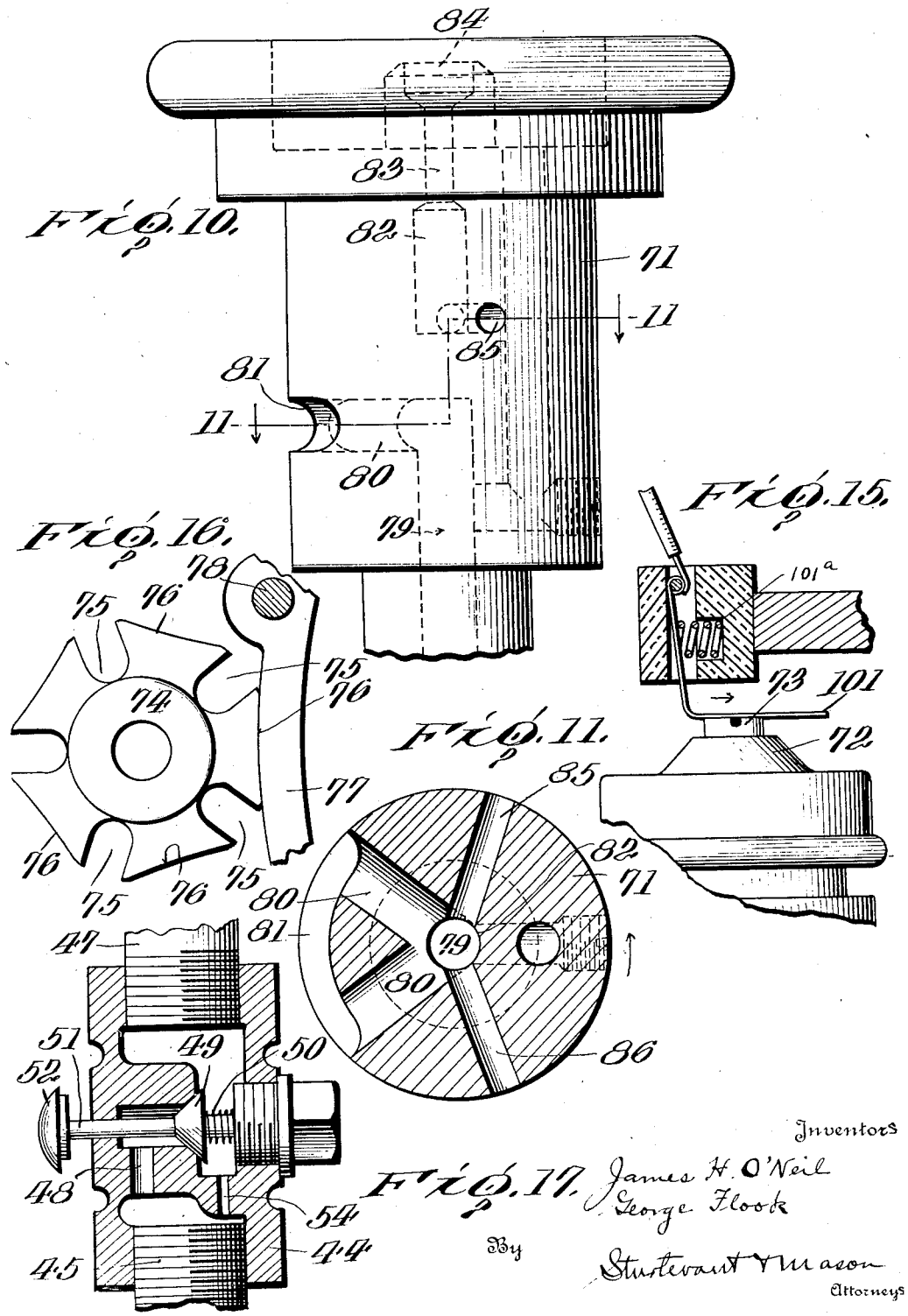

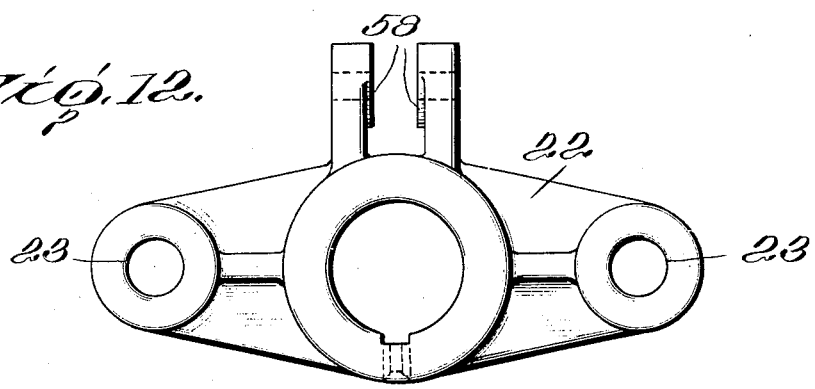
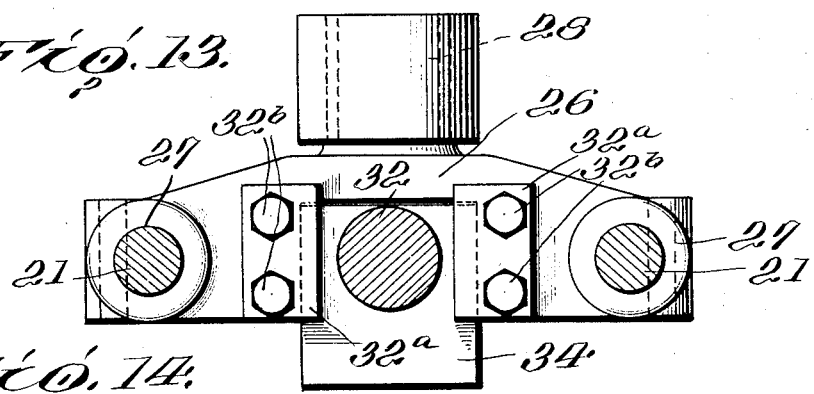
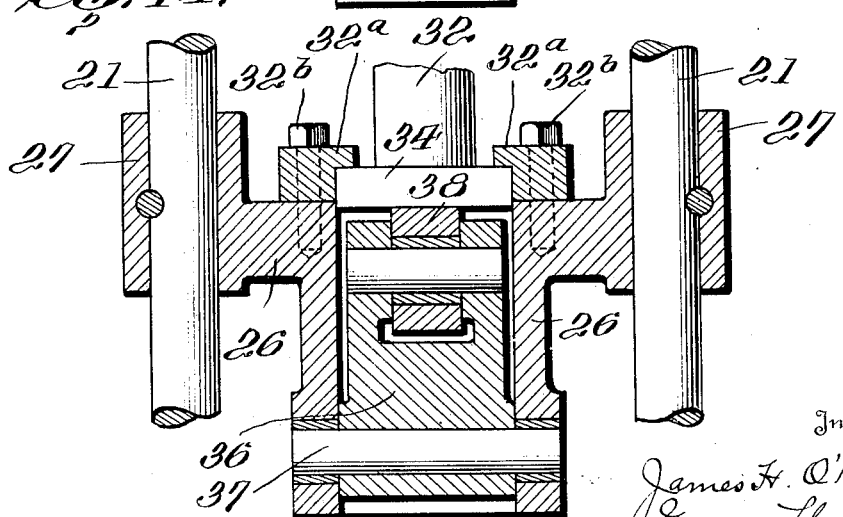

Patented July 21, 1931

1,815,522

UNITED STATES PATENT OFFICE

JAMES H. O'NEIL AND GEORGE FLOOK, OF SYRACUSE, NEW YORK, ASSIGNORS TO CONTINENTAL CAN COMPANY, INC., OF NEW YORK, N. Y., A CORPORATION OF NEW YORK

AUTOMATIC CAN TESTING MACHINE

Application filed July 12, 1927. Serial No. 205,255.

The invention relates to new and useful improvements in an automatic can testing machine. In the application filed February 27, 1925, by James H. O'Neil, Serial No. 11,991, there is shown and described an automatic can testing machine wherein the can to be tested is placed in an individual chamber containing a non-compressible fluid. The can is closed, and the chamber is closed, and the closed can is subjected to air pressure. If there is a leak in a can, the air passing out through the leak into the non-compressible fluid in the chamber surrounding the can, will cause the displacement of the fluid through a passage in the wall of the chamber, and this displacement of the fluid is utilized for operating a means for ejecting the leaky can. The present invention is directed to a machine of this type.

One of its objects is to provide a machine of the above type, wherein the non-compressible fluid which is displaced from the chamber may be utilized for establishing an electric circuit which controls the ejecting means for ejecting the leaky can.

Another object of the invention is to provide a machine of the above type, wherein the non-compressible fluid which is displaced by the escaping of air through the leak in the can, is trapped and held for a period of time after the chamber has been opened and the can removed therefrom for establishing an electric circuit, so that the ejecting means may be actuated to discharge the leaky can after the chamber is opened.

A still further object of the invention is to provide a machine of the above type wherein the non-compressible fluid displaced from the chamber during the placing of the can therein by the closing of the chamber, may be allowed to overflow, after which the overflow passage is closed so that the escaping air through a leak operating upon the non-compressible fluid will bring about an establishment of the electric circuit.

A still further object of the invention is to provide a machine of the above type, wherein the cans to be tested are in upright position during testing and are positioned in a chamber which is open at its upper end so that the non-compressible fluid may, in a large measure, be retained in the chamber and used over and over for testing other cans.

A still further object of the invention is to provide a machine of the above type wherein a series of chambers travel in a horizontal plane; the cans fed in succession to the traveling chambers, tested, removed from the chambers, and then ejected, the leaky cans being separated from the perfect cans at the time of ejection.

A still further object of the invention is to provide a machine of the above type, wherein the can to be tested is placed on a supporting plate and lowered thereby into the testing chamber, after which the chamber is closed by a pad which is movable vertically into engagement therewith.

A still further object of the invention is to provide a machine of the above type, wherein the pad which closes the chamber may also be utilized to close the can, and the movement of the parts of the machine are so timed that the can is closed prior to the closing of the chamber.

A still further object of the invention is to provide means for supplying air under pressure to the can to be tested after it is closed, said supply means being, in the main, cut off prior to the closing of the chamber, so that in case of very large leaks, the compressed air will not displace the non-compressible fluid entirely so as to prevent proper testing when the overflow is closed.

These and other objects will in part be obvious and will in part be hereinafter more fully disclosed.

In the drawings which show by way of illustration one embodiment of the invention—

Fig. 2 is a view partly in plan and partly in section showing the upper face of the rotating turret and portions of the adjacent frame;

Fig. 3 is an enlarged vertical sectional view radially of the rotating turret, showing one of the testing units and the parts associated therewith, the parts being positioned for receiving the can to be tested;

Fig. 4 is a view similar to Fig. 3, but showing the can as partially lowered into the testing chamber, the can being closed and the air valve opened so as to supply the compressed air to the can for testing the same;

Fig. 5 is a view similar to Fig. 3, but showing the chamber closed and the can to be tested enclosed therein, the control valve for the displaced fluid being open so as to permit overflow, due to compression of the rubber pad;

Fig. 6 is an enlarged view of a portion of the chamber, the closing pad, the can and the fluid control valve with the valve connected to the chamber and with a perfect can in the testing chamber;

Fig. 7 is a similar view showing the position of the fluid with a leaky can and the valve turned so as to trap the fluid;

Fig. 8 is a view similar to Fig. 7, but showing the chamber opened and the can raised and positioned for being ejected;

Fig. 9 is a view similar to Fig. 8, but showing the control valve as turned so as to release the trapped fluid back into the testing chamber;

Fig. 10 is an enlarged side view of the control valve;

Fig. 11 is a sectional view of the line 11, 11 of Fig. 10;

Fig. 12 is a plan view of the cross head supporting the closing pad for the can and chamber;

Fig. 13 is a plan view of the cross head for raising and lowering the rods which carry the upper cross head;

Fig. 14 is a front view of the cross head shown in Fig. 13;

Fig. 15 is a detail showing the mounting of the contact strip;

Fig. 16 is a detail showing the disk for operating the valve control, and

Fig. 17 is an enlarged detail of the valve head for controlling the air.

Figure 1:
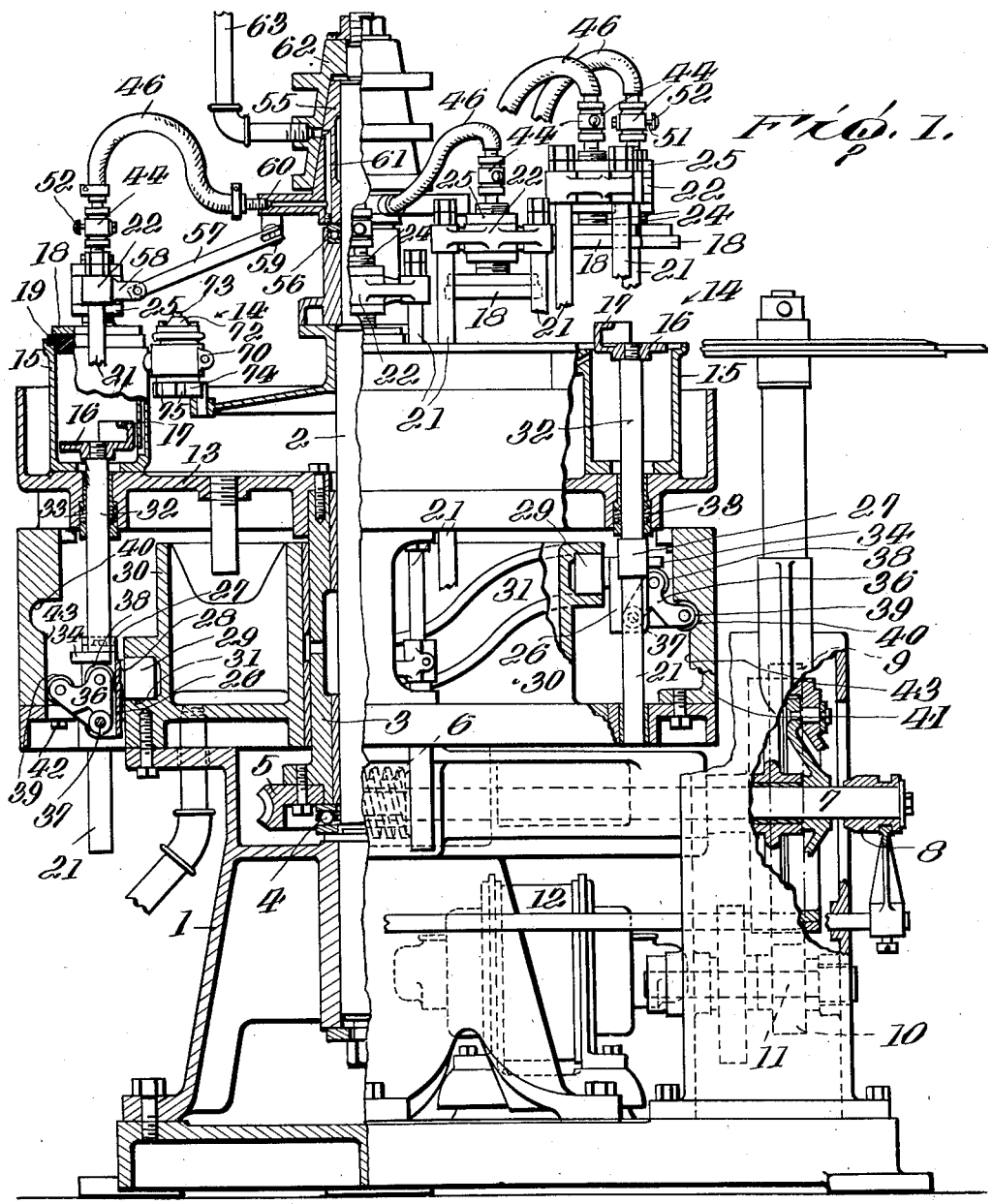
Figure 1 is a view partly in section and partly in side elevation with parts broken away, showing an automatic testing machine embodying the improvements.

The invention relates to a can testing machine wherein the cans to be tested are placed in individual chambers. These testing chambers are arranged in units on a continuously rotating turret, and the cans are fed into the machine at one point in their rotation, are tested, and then ejected from the machine at another point in their rotation, the leaky cans being ejected at one point and the perfect cans at another. The testing chamber of each unit is arranged vertically with its upper end open. This chamber is rigidly mounted upon the rotating turret. The chamber is partially filled with a non-compressible fluid, preferably water. The can to be tested is placed upon a supporting plate therefor in upright or vertical position, with the open end at the top. A closing pad closes first the can to be tested, and then the chamber, the supporting plate for the can moving down into the chamber after the can is closed. Compressed air is supplied to the closed can after it is closed and before the chamber is closed to allow the can to expand. The main supply of compressed air is cut off just before the chamber is closed, but there is a small bypass which allows the continuous supply of compressed air to the can to be tested. Associated with each testing unit is a passage leading to the interior of the testing chamber. There is a control valve for this passage which is shifted step by step during the rotation of the turret carrying the testing units. The valve is so constructed that the passage leading from the chamber may be connected through the valve so as to become an overflow passage. During the closing of the chamber, if the chamber is full of water, after the can is lowered into the same, any pressure brought to bear on the fluid surrounding the can by the closing of the chamber will merely cause an overflow of the fluid. After the chamber is closed, then the valve is closed, and no further displacement of the fluid in the chamber will occur unless there is a leak in the can. In case of a leak in the can, the air escaping through the leak will exert a pressure on the non-compressible fluid, and force the fluid out through the passage in the wall thereof. The valve has been shifted so as to connect this passage with a chamber having an insulating cap at the top thereof and an electric terminal extending through the cap, so that when sufficient fluid has been displaced, it will connect said terminal with the metal parts of the machine and in part establish an electric circuit. The valve is next shifted so as to maintain this circuit established by trapping the displaced fluid, after which the chamber may be opened, and the tested can removed from the chamber. At a certain point in the rotation of the turret, the electric terminal carried by the insulating cap at the top of the valve, passes underneath a contact strip, and this is what completes the circuit which electrically energizes a solenoid and brings about the ejection of a leaky can, provided that there has been a sufficient displacement of the non-compressible fluid by the escape of the air through the leak in the can, as to bring about the initial establishment of the circuit.

Referring more in detail to the drawings, the improved testing machine comprises a main supporting frame 1 which is provided with a central fixed column 2 on which is mounted a sleeve 3 for rotation. The sleeve is mounted on a ball bearing 4 carried by the frame which is located at the lower end of the sleeve. Attached to the lower end of sleeve is a gear 5 which meshes with a worm 6 on the operating shaft 7. This operating shaft 7 may be connected through a suitable clutch 8 with a gear 9 meshing with a gear 10 on a counter-shaft 11 which is operated by a motor 12. When the clutch is closed, the sleeve rotates on the center column and will rotate continuously. Mounted on this sleeve 3 is a turret 13. The turret 13 is provided with a series of testing units. There are twelve testing units, as shown in Fig. 2 of the drawings. The number of units, however, may be increased or decreased. Each unit operates entirely independently of the other units, and the units will operate in succession. The testing units are indicated as a whole in Fig. 2 by the numerals 14, 14. These units, are entirely separate, and are all similar, and a detail description of one will answer for the others. After having described in detail the testing units, further description will be given of the continuous operation of the machine.

The testing unit is shown in detail in Figures 3 to 14, inclusive. Fixed to the rotating turret 13 is a cup-shaped receptacle 15 which forms the testing chamber. This receptacle is open at its upper end, and for testing cylindrical cans, it is preferably cylindrical in cross section. Associated with each testing chamber is a supporting plate 16 having a half mold guide plate 17 for centering the can on the supporting plate 16. The can is indicated at C, and is shown in Fig. 3 as resting on the supporting plate 16 and centered thereon. The can stands in a vertical position, with the open end of the can at the top thereof. Directly above the plate 16 and raised therefrom a sufficient distance to permit the can to be placed on the plate, is a head 18 carrying a rubber pad 19 which is secured to the head by means of a hollow bolt 20. The pad performs the double function of closing the can, and also closing the chamber. To bring this about, the pad is reciprorocated during the rotation of the turret. Mounted in suitable supporting bearings in the turret are two spaced rods 21, 21. These rods are located at opposite sides of the chamber 15. A cross head 22 is secured to the upper ends of the rods. This cross head is shown in plan view in Fig. 12. The cross head is provided with openings 23, 23 for the rods, and the rods are rigidly secured in these openings in any desired way. Extending through the cross head 22 is a sleeve 24, and the head 18 is formed integral with this sleeve. The sleeve has a splined connection with the cross head so that it may be adjusted vertically in the cross head. It is held in adjusted position by threaded collars 25, 25 which engage the threaded ends of the sleeve 24. Thus it is that the cross head supports the plate 18 and the pad carried thereby, and the head and pad may be adjusted vertically in the cross head. Secured to the lower ends of the rods 21, 21, is a lower cross head 26.

This lower cross head is shown in detail in Figures 13 and 14. The cross head is provided with sleeves 27, 27 which receive the lower ends of the rods, and these sleeves may be secured in any desired way to the rods. This lower cross head 26 is provided with a projecting stud 28. Mounted on this projecting stud 28 is a roller 29. Mounted on the frame 1 directly beneath the rotating turret 13 is a circular bracket 30. This circular bracket 30 is stationary, as it is bolted to the frame. Said bracket is provided in its outer face with a cam groove 31, and the roller 29 runs in this cam groove. The cam groove is, of course, shaped so as to raise and lower the lower cross head, and this will raise and lower the rods and the upper cross head. Thus it is that the pad directly above the can to be tested, is moved down so as to be brought into engagement with the upper edge of the testing chamber for closing the same. The pad also closes the can.

The supporting plate 16 is carried by a supporting rod 32. This rod extends through an opening in the bottom of the chamber and down through the turret. There is a packing 33 for closing the opening through which the rod passes, so that the rod may reciprocate in the opening, and yet form a tight joint so that the non-compressible fluid for testing the can will not escape through said opening. The rod 32 is provided with a lateral projecting head 34 at its lower end. The under face 35 thereof bears against a roller 38 carried by a rock arm 36 mounted on a pivot shaft 37 rockable in suitable bearings in the lower cross head. Gibs 32$^a$ are secured to the lower cross head by bolts 32$^b$. These gibs overlie the head 34 and insure the down movement of the support and rod when no can is present in the testing unit. The head is rectangular and this prevents the rod turning. The rock arm 36, of course, moves up and down with the cross head, and as the cross head begins its downward movement, the plate 16 will also begin its downward movement. The rock arm 36 carries another roller 39. This roller 39, as shown in Fig. 3, is seated in a recess 40. The recess 40 is formed in a bracket member 41 carried by the rotating turret. Said bracket member 41 is secured to the rotating turret by bolts 42. Directly beneath the recess 40 is a vertical wall 43. As a matter of fact, the recess 40 is formed in this vertical wall, and therefore, the roller 39 will move from the recess inwardly and upwardly on to the wall 43 when the parts are lowered from the position shown in Fig. 3. In Fig. 4, the roller is shown as just passing out of the recess on to the vertical wall 43. This causes the swinging of the rock arm 36, and as the rock arm 36 swings so as to bring the roller 38 more directly over the pivotal support of the rock arm, it will move the bearing surface away from the pivotal support 37 on the lower cross head. In Fig. 5 of the drawings, the cross head is shown as at its extreme lower position.

The resulting action from the parts just described is as follows. When the lower cross head starts on its downward movement, it will, of course, move the upper cross head downward therewith. This will move the closing pad 19 toward the open end of the testing chamber. The downward movement of the cross head will, of course, cause the downward movement of the plate 16 supporting the can, but the oscillation of the rock arm 36 will delay the downward movement of the supporting plate 16 by its movement of the bearing surface 35 away from the moving pivotal point 37 of the rock arm. This delayed movement in the downward movement of the can will cause the closing pad to close the can while the roller 39 is moving from its recess, as shown in Fig. 3, to a position in engagement with the vertical wall 43, as shown in Fig. 4. The can is now closed, and the parts will move on downward without any shifting of the supporting plate 16 relative to the cross heads. In other words, the can will remain closed, and as the closed can moves into the chamber, the chamber will be closed, as shown in Fig. 5 of the drawings. This shifting of the parts for the closing of the can, and then the closing of the chamber, occurs, of course, while the rotating turret is on its continuous travel, and it is brought about, as noted, by the roller 29 running along the stationary cam formed in the frame of the machine.

The closed can is supplied with air for testing through the center of the closing pad therefor. The sleeve carrying the plate 18 which supports the closing pad carries a valve head 44 which is connected thereto by a coupling 45. The flexible pipe 46 is connected to a coupling 47 at the upper end of the valve head. This pipe 46 is connected to a source of compressed air so that air is supplied through the pipe to the valve head, and through the valve head down through the pad to the can to be tested. This valve head has a main supply port 48. A small valve 49 closes the port 48. A spring 50 normally holds the valve seated and the port closed. The valve is carried by a stem 51, which stem is provided with a head 52 at its outer end. As shown in Fig. 4 of the drawings, there is a stationary cam 53 carried by the frame of the machine, which, at the proper time in the rotation of the turret, engages the head 52 and opens the valve 49, so as to permit the compressed air to flow into the can. At the proper time, this cam will release the valve and it will close, cutting off the supply of compressed air. There is a small bypass port 54 which will allow a small amount of air to pass out through the head at all times. The purpose of this will be explained later.

There is, of course, a flexible pipe 46 for each testing unit, and these flexible pipes are connected to a rotating head 55 mounted at the upper end of the stationary column 2. Said rotatable head is supported on a ball bearing 56. The head, as shown in the present embodiment of the invention, is connected by means of a link 57 to the upper cross head of its associated testing unit. The cross head has a lug 58 to which the link is pivoted. The link, at its other end, is forked so as to engage a pivot pin 59 carried by a lug 60 on the head 55. As the turret rotates, it will, through the links 57, cause the head to rotate, and these links will, at the same time, permit each cross head at the proper interval to be raised and lowered. The pipe 46, which is a flexible pipe, permits this raising and lowering of the cross heads. This pipe 46 is connected to the head 55. The head 55 is provided with a passage 61 which supplies the air to the flexible pipe with which it is associated. There is a cap plate 62 which is mounted on the upper end of the stationary column, and a supply pipe 63 is connected to this cap plate. The ports are so constructed that compressed air is supplied to the rotating head 55 at the proper time intervals for furnishing compressed air to the testing units.

The chamber of each testing unit is supplied with a non-compressible fluid, preferably water. A water inlet pipe 64 is provided, which slowly feeds water to the chambers as they pass beneath the same. It is only necessary to supply a small amount of water to each chamber as it passes the pipe, for the reason that the water in the chamber is used over and over again, and all that is necessary is to supply the slight waste that occurs through the overflowing of the chamber when the container is lowered into the same. It is desirable to have the chamber full of water up to the pad when it is closed with the container therein, so that no air is trapped in the chamber. If a very slight amount of air is trapped in the chamber, it will do no harm. If a large percentage of air is trapped in the chamber, air escaping from the leaky container would displace the non-compressible fluid in the chamber less rapidly, which in the given time to test would not bring about the ejecting of the container. It is essential, therefore, that the chamber be supplied with a small amount of water so as to maintain a proper amount in each chamber for the operation of the testing unit. It is noted in this connection that the chamber is arranged with its open end at the top, and therefore, the non-compressible fluid will not run out of the chamber when the same is open.

Near the upper end of the wall of the chamber 15 is a passage 65. This passage is connected to a pipe 66 which extends down into the chamber. The plate 16 which supports the cam has a groove 67 formed in its side wall for clearance for the pipe. This passage 65 leads to a control valve 68. The control valve 68 includes an inner and an outer sleeve, the outer sleeve 69 of which is mounted in a bracket 70 formed as a part of the wall of the chamber 15. This outer sleeve is clamped in this bracket 70. The inner sleeve 71 is free to rotate in the outer sleeve. This inner sleeve is made of metal. At the upper end of the inner sleeve is a cap 72 of insulated material. Mounted in the cap 72 is a metallic screw terminal 73 for the electric circuit. The valve 68 is rotated by means of a disk 74 which is attached to the lower end of the inner sleeve 71. This disk, as clearly shown in Fig. 16, is provided with equally spaced radial slots 75, and intermediate the radial slots are slightly curved faces 76. Attached to the frame of the machine is a ring 77 which is provided with a series of pins 78. As the turret rotates, a pin 78 will be passed into one of the radial slots and will give the valve a partial angular rotation. The ring 77 engaging the surface 76 of the disk intermediate the radial slots, will hold the valve from rotation in its various angular positions. The valve has a central passage 79 and two radial passages 80, 80 (see Fig. 11) with a connecting circumferential passage 81. At certain positions of the valve, the passage 65 leading to the chamber 15 will connect with this circumferential passage 81, and that, of course, connects with the centrally located passage 79. This establishes a line of communication from the chamber to the atmosphere.

In line with the central passage 79, and in the upper part of the sleeve 71, is a chamber 82. This chamber connects through a slightly narrower passageway 83 with a chamber 84 at the upper end of the sleeve 71. The screw 73 extends down through the cap 72 and has its lower end extending into this chamber 84. This screw, as stated above, forms an electric terminal and it is spaced from the walls of the chamber 84 so that it does not make contact with this inner sleeve 71. The sleeve 71 is provided with a radial passage 85. The valve is turned in the direction of the arrow in Fig. 11. In the next angular step movement of the valve, the passage 85 will be brought into alinement with the passage 65, and thus the chamber 15 connected with the chamber 82 in the valve. The next step movement of the valve closes the passage 85 as it is moved out of alinement with the passage 65, and this chamber will remain closed until the passage 86 is brought into alinement with the passage 65. Then the chamber 82 is again connected with the chamber 15.

The operation of the testing machine will now be described. The cans to be tested are fed to the machine from a runway indicated at 87 by a traveling belt 88. The cans are received on to the supporting bracket 89 and are timed and fed into the machine by a rotating timing wheel 90. This timing wheel is provided with spaced pockets 91. Between the pockets 91 there are circumferential sections 92 which operate to hold back the cans and permit the cans to be moved only as they are seated in these pockets 91. A curved guide 93 cooperates with this timing wheel 90. A can C is just passing into the pocket from the runway 87. A can $C^1$ has been moved part way into the machine, and the can $C^2$ has been moved on to a supporting plate of one of the testing units. An adjustable guide 94 fixed to the frame of the machine assists in the centering of the can on the supporting plate 16. The half mold guide 17 actuatlly centers the can on the plate in cooperation with the rotating timing wheel 90. It is understood that the can is placed in the testing unit while it is moving, and after it has been transferred and centered on the supporting plate of the testing unit, then it moves along with the unit.

This loading station is indicated in Fig. 2, as station A. The position of the parts of the testing unit at station A are indicated in Fig. 3. At this time, the supporting plate is at the upper end of its movement and flush with the top of the chamber 15. The chamber 15, through the passage 65, is connected with the passage 79 and the atmosphere. As the turret rotates, the cam groove 31 operating upon the roller 29 will lower the lower cross head. The downward movement of the lower cross head through the rods connected to the upper cross head will lower the plate 18 and the pad 19 carried thereby. The support 16 will also be lowered, but at a slower speed, because of the rock arm 36 oscillating on its pivotal support retarding the downward movement of the plate 16. The result is that the pad 19 will be firmly seated in the upper end of the can on the supporting plate 16, and thus the can will be closed. When the can was placed on the supporting plate with the parts positioned as shown in Fig. 3, the valve controlling the compressed air supply to the valve head in the upper cross head was closed. As the turret rotates, the head 52 of the valve stem 51 comes into contact with the stationary cam rail 53, and this will cause the valve to be opened. Compressed air flows through into the can, and the can is thus filled with air under pressure. This occurs during the downward movement of the can. Before the pad reaches the top of the chamber 15 to close the same, the valve 49 is released and the spring back of it closes it, so that the main supply of compressed air is cut off. If there is a bad leak in the can, the greater portion of the air will pass out of the can and escape to the atmosphere before the chamber 15 is closed by the pad 19.

As has already been described, the chamber 15 is supplied with a non-compressible fluid, preferably water. When the can is lowered into the chamber to the position shown in Fig. 5, the chamber is closed by the pad 19, and the water or non-compressible fluid will rise around the can and will pass out through the passage 65 and down through the passage 79, overflowing, if there is an excess of water present sufficient to cause an overflowing. It is desirable to completely fill the space around the can when the chamber is closed, although this is not absolutely necessary. If a very small space is left, the displacement will take place in the manner to be described. If the can is a perfect can, then the air will remain confined in the can. If it has a leak, the air will escape, and the non-compressible fluid surrounding the can will be displaced from the chamber 15 to a certain extent, depending of course, upon the size of the leak. Assuming that there is a very large leak in the can, so that the pressure of the air in the can is lowered to that of the atmosphere after the valve has been closed, air will pass through the auxiliary passage 54 (see Fig. 17) and will build up a sufficient pressure in the can being tested, so that with a large leak, a certain amount of the non-compressible fluid will be displaced from the chamber 15 into the passage 65. As the turret rotates, the disk controlling the valve 68 will engage the pin 78 and will be given one angular step movement. When station B is reached, the parts of the testing unit are then in the position shown in Fig. 5. At this time, the chamber 15 has just been closed by the pad 19. The valve 68 is still connected to the atmosphere, and any forcing of non-compressible fluid into the passage 65 by the pad entering the chamber, causes an overflow to the atmosphere. When the turret brings the testing unit to the station C, the disk engages a pin 78′ and is given another angular turn. This brings the passage 85 into alinement with the passage 65, and connects the chamber 82 with the chamber 15 in which the can has been placed. If there is a leak in the can, the escaping air will displace a portion of the non-compressible fluid in the chamber 15, causing it to pass out through the passage 65, and through the passage 85 into the chamber 82, and rise in the chamber 82 until the chamber 84 is filled. When the chamber 84 is filled, then the end of the electric terminal will extend down into the non-compressible fluid. Any overflowing of the chamber 84 will drain out through a suitable opening 79$^a$ in the valve.

As the turret continues to rotate, the parts remain as described for a certain angular rotation of the turret, and this gives ample time for the displacement of the non-compressible fluid into the chamber 84 by a very slow leak. Just before station D is reached, the pin 78$^2$ will engage the disk and rotate the valve to the position shown in Fig. 7. It is noted that when the parts are in the position shown in Fig. 6, that is, at station C, the overflow to the atmosphere was cut off. When the parts are in the position shown in Fig. 7, the chamber 82 is cut off from the chamber 15, and the non-compressible fluid is thus trapped in the chamber 84. The auxiliary electric circuit is established between this electric terminal at the top of the cap through the fluid and the inner sleeve of the valve and the frame of the machine. This auxiliary establishment of the circuit is maintained by the trapping of the fluid in the chamber 84. In other words, between the station C and the station D, if there is a leak in the can, a sufficient amount of non-compressible fluid has been displaced so as to establish this auxiliary electric circuit, and it is thus maintained so that at the proper time the circuit may be completed which will cause the ejection of the leaky can. Inasmuch as this chamber 82 is cut off from the chamber 15, and the non-compressible fluid is trapped for performing this function in the electric circuit, then the chamber 15 can be opened and the can removed therefrom. The can 31 is so shaped as to cause the cross heads to be raised after station D is passed. In Fig. 8, the cross heads are shown as raised, and the can brought back by the upward movement of the support 16 to a position where it is on a level with the top of the chamber 15.

There are two separate devices for ejecting the cans from the rotating turret. One operates upon the leaky cans and the other upon the perfect cans. If there is a leaky can, the ejector arm 95 moves across the upper side of the plate 16 and will strip the can from the plate and discharge it into the receiving chute 96. This arm 95 is pivoted at 97 and is connected by a link 98 with the core member 99 of a solenoid 100. A spring surrounding the core normally moves the same outward and holds the arm 95 in withdrawn position. The screw terminal 73 passes beneath the contact plate 101, and this will establish a circuit directly, or through a relay, about the solenoid, energizing the same, and this will cause the arm 95 to be moved for ejecting the leaky can. A terminal screw 73 moves beneath a contact plate 101 in the direction of the arrow in Fig. 15. A spring 101$^a$ bears against the contact plate which is hinged to its supporting bracket at a point above the spring, and this yieldingly holds the contact plate in engagement with the terminal screws. The screw terminals of the various testing units pass in succession beneath the contact plate 101, and will make engagement therewith, but if there is no leak in the can, then there will be no fluid trapped in the chamber 84, and no making of the auxiliary circuit, and therefore, the solenoid will not be energized. In other words, it takes the establishment of the auxiliary circuit by the displacement of the fluid through the leak in the can in order to bring about the energizing of the solenoid when the contact member 101 is reached. If there is no leak in the can, and the can is not ejected by the arm 95, then it will be ejected by the arm 102. The arm 102 is mounted so as to swing across the plate 16 sufficiently to eject the can carried thereby into the chute 103. This arm 102 is yieldingly held by a spring 104 so that it bears against the rods connecting the cross heads and will move from contact with one rod to the one following, and then to a can on the plate 16, if there is a can on the plate 16. If, therefore, a can is placed on the turret in one of the testing units, and it is not ejected therefrom by the arm 95, because it is a good can, then it will be ejected from the testing unit by the arm 102.

The valve disk after passing the ejector arm 95, engages a pin 78³, and this will restore the valve to the position shown in Fig. 9, thus permitting the trapped fluid in the chamber 84 to drain back through the passage 65 into the chamber 15.

From the above description, it will be apparent that a testing machine has been provided having a plurality of testing units which travel continuously, and which operate entirely independent of each other for testing a can. Each unit tests a single can. No matter whether the leak is large or small, the can will be ejected at the proper time. If the can has a very large leak, the control of the air supply thereto is such that the escaping of the air through the large leak does not in any way interfere with the operation of the testing unit.

While we have shown and described a testing machine wherein the non-compressible fluid establishes an auxiliary circuit which brings about at the proper intervals, the ejection of the can, it will be understood, of course, that other means may be provided whereby the displacement of the non-compressible fluid will establish this auxiliary circuit, in case only that a leaky can is in the testing unit.

While we have shown the passage for the displaced fluid in the side wall of the testing chamber, it will be understood that it may be otherwise positioned. It will be noted that the supporting plate 16 is provided with passages 16ª, and with a raised central portion. This is for the purpose of permitting the non-compressible fluid to make contact with the end of the can, and the raised portion is for the purpose of preventing the bulging of the end of the can.

It will be obvious that minor changes in the details of construction and the arrangement of the parts may be made without departing from the spirit of the invention as set forth in the appended claims.

Having thus described the invention, what we claim as new and desire to secure by Letters-Patent, is—

1. A machine for testing cans for leaks including means for supporting and closing the can for testing, means for subjecting said cans to air pressure, means for forming about said can a chamber containing a non-compressible fluid, said chamber having a passage leading therefrom, and electrically controlled means operated by the displacement of the fluid from said chamber into said passage by air escaping from the can through a leak therein into the fluid, for separating the can having the leak from the perfect cans.

2. A machine for testing cans for leaks including means for supporting and closing the can for testing, means for subjecting said cans to air pressure, means for forming about said can a chamber containing a non-compressible fluid, said chamber having a passage leading therefrom, and electrically controlled means operated by the displacement of the fluid from said chamber into said passage by air escaping from the can through a leak therein into the fluid, for separating the can having the leak from the perfect cans, said electrically controlled means including devices whereby the non-compressible fluid serves to establish an auxiliary circuit when displaced from said chamber.

3. A machine for testing cans for leaks including means for supporting and closing the can for testing, means for subjecting said cans to air pressure, means for forming about said can a chamber containing a non-compressible fluid, said chamber having a passage leading therefrom, electrically controlled means operated by the displacement of the fluid from said chamber into said passage by air escaping from the can through a leak therein into the fluid, for separating the can having a leak from the perfect cans, said electrically controlled means including a chamber adapted to receive a portion of the non-compressible fluid displaced by air escaping from the leak in the can, which fluid establishes an electric connection, and means for trapping said fluid so that the chamber may be opened and the can removed and subsequently ejected by the electrically controlled means.

4. A machine for testing cans for leaks including means for supporting and closing a can for testing, means for subjecting said cans to air pressure, means for forming about said can a chamber containing a non-compressible fluid, said chamber having a passage leading therefrom, electrically controlled means operated by the displacement of the fluid from said chamber into said passage by air escaping from the can through a leak therein into the fluid for separating the can having a leak from the perfect cans, said means for subjecting the cans to air pressure including devices for cutting off the main air supply prior to the closing of the chamber about the can, and means for admitting slowly air under pressure to the can after the chamber is closed.

5. A machine for testing cans for leaks including a rotating turret having a plurality of testing units, each testing unit comprising means for supporting a can for testing, means for closing the can, means for subjecting the cans to air pressure after they are closed, means for forming about each can, a chamber containing a non-compressible fluid, the wall of the chamber having a passage leading into the chamber, and electrically controlled means operated by the displacement of fluid from said chamber into said passage by air escaping from the can through a leak for separating the can having a leak from the perfect cans.

6. A machine for testing cans for leaks including a rotating turret having a plurality of testing units, each testing unit comprising means for supporting a can for testing, means for closing the can, means for subjecting the cans to air pressure after they are closed, means for forming about each can, a chamber containing the non-compressible fluid, the wall of the chamber having a passage leading into the chamber, and electrically controlled means operated by the displacement of fluid from said chamber into said passage by air escaping from the can through a leak for separating the can having the leak from the perfect cans, said electrically controlled means including devices whereby the displaced non-compressible fluid establishes an auxiliary electric circuit.

7. A machine for testing cans for leaks including a rotating turret having a plurality of testing units, each testing unit comprising means for supporting a can for testing, means for closing the can, means for subjecting the cans to air pressure after they are closed, means for forming about each can, a chamber containing a non-compressible fluid, the wall of the chamber having a passage leading into the chamber, electrically controlled means operated by the displacement of fluid from said chamber into said passage by air escaping from the can through a leak for separating the can having the leak from the perfect cans, said electrically controlled means including devices whereby the displaced non-compressible fluid establishes an auxiliary electric circuit, and means for trapping the displaced non-compressible fluid to maintain the auxiliary circuit established, whereby at a later point in the rotation of said turret, the circuit may be completed, thus energizing the solenoid for actuating the ejector for ejecting the leaky can.

8. A machine for testing cans for leaks including a rotating turret having a plurality of testing units, each testing unit comprising means for supporting a can for testing, means for closing the can, means for subjecting the cans to air pressure after they are closed, means for forming about each can, a chamber containing a non-compressible fluid, the wall of the chamber having a passage leading into the chamber, a valve having a chamber therein and independent passages leading to said chamber and adapted to be successively connected with the passage in the wall of the chamber, means for turning said valve through angular step movements as the turret rotates, including devices spaced for positioning said valve whereby the passage in the wall of the container is connected to the atmosphere during the closing of the chamber so as to permit the non-compressible fluid to overflow, and to again turn the valve for positioning the same so that the non-compressible fluid displaced from the chamber by air escaping through the leak is led to a chamber in the valve for establishing an auxiliary electric circuit, and for then turning the valve to position the same for trapping the non-compressible fluid in the chamber whereby said chamber may be opened and the can removed therefrom, and the electric circuit subsequently used for ejecting the can.

9. A machine for testing cans for leaks including a rotating turret, a series of testing units mounted on said turret, each testing unit including means for supporting and closing a can, means for supplying air to the can under pressure, means for forming a closed chamber about said can, for containing a non-compressible fluid, said chamber having a passage through the wall thereof through which said non-compressible fluid may be displaced by air escaping through a leak, electrically controlled mean for ejecting a leaky can, said electrically controlled means being set for operation by the non-compressible fluid, establishing an electric connection at the testing unit, an ejecting arm, a solenoid for operating said arm, and a contact associated with the solenoid and adapted to establish an electric circuit when the testing unit reaches a predetermined point in the rotation of the turret whereby the ejecting arm has actuated to eject the leaky can.

10. A machine for testing cans for leaks including a rotating turret, a series of testing units mounted on said turret, each testing unit including means for supporting and closing a can, means for supplying air to the can under pressure, means for forming a closed chamber about said can, for containing a non-compressible fluid, said chamber having a passage through the wall thereof through which said non-compressible fluid may be displaced by air escaping through a leak, electrically controlled means for ejecting a leaky can, said electrically controlled means being set for operation by the non-compressible fluid, establishing an electric connection at the testing unit, an ejecting arm, a solenoid for operating said arm, a contact associated with the solenoid and adapted to establish an electric circuit when the testing unit reaches a predetermined point in the rotation of the turret whereby the ejecting arm is actuated to eject a leaky can, means for rotating said turret continuously, means for feeding cans in succession to the testing unit, and means for ejecting the perfect cans before the turret has made a complete rotation.

11. A machine for testing cans for leaks including a rotating turret, a series of testing units carried by said turret, each unit including means for supporting and closing a can, means for forming a closed chamber about said can for a non-compressible fluid, said chamber having a passage through the wall thereof, means for subjecting said can to air pressure whereby air escaping through a leak in the can will displace the non-compressible fluid through said passage, means for utilizing the displaced fluid for ejecting a leaky can, said means for supplying air under pressure including devices whereby said can is subjected to air pressure prior to the closing of the chamber and the main supply cut off before the chamber is empty, and for supplying continuously a small amount of air under pressure to said can.

12. A machine for testing cans for leaks including a rotating turret having a series of testing units thereon, each unit including a chamber for a non-compressible fluid, said chamber having an opening to receive a can at the top thereof, and a passage in the wall thereof adjacent the top, a support for the can associated with the chamber and adapted to lower the can into the chamber, a closing pad for first closing the can and then subsequently closing the chamber, means for subjecting said can to air pressure, and means for utilizing the non-compressible fluid displaced through said passage by air escaping from the leak for causing the leaky can to be ejected.

13. A machine for testing cans for leaks including a rotating turret having a series of testing units thereon, each unit including a chamber having an opening to receive the can at the top thereof and a passage through the wall of the chamber adjacent the top, said chamber having a non-compressible fluid therein, a support to receive the can, a reciprocating rod passing up through the bottom of said chamber and carrying said support, said support being normally level with the top of the chamber whereby a can may be placed on the support during the rotation of the turret, means actuated by the rotation of the turret for lowering the support with the can into the chamber, a pad for engaging the can for closing the same and subsequently engaging the chamber for closing the chamber, said pad being raised and lowered by the means raising and lowering the support for the can, means for subjecting the can to air under pressure, and means whereby the fluid displaced through the passage in the wall of the chamber by air escaping from the leak may be utilized for causing the leaky can to be ejected.

14. A machine for testing cans for leaks including a rotating turret having a series of testing units thereon, each unit including a chamber having an opening to receive the can at the top thereof and a passage through the wall of the chamber adjacent the top, said chamber having a non-compressible fluid therein, a support to receive the can, a reciprocating rod passing up through the bottom of said chamber and carrying said support, said support being normally level with the top of the chamber whereby a can may be placed on the support during the rotation of the turret, means actuated by the rotation of the turret for lowering the support with the can into he chamber, a pad for engaging the can for closing the same and subsequently engaging the chamber for closing the chamber, said pad being raised and lowered by the means raising and lowering the support for the can, means for subjecting the cans to air under pressure, and means whereby the fluid displaced through the passage in the wall of the chamber by air escaping from the leak may be utilized for causing the leaky can to be ejected, said means for supplying air including devices operated by the rotation of the turret for subjecting the cans to air pressure after the cans are closed, cutting off the air pressure before the chamber is closed, and also including means whereby a small supply of air under pressure is continuously supplied to the can after the chamber is closed.

15. A machine for testing cans for leaks including a rotating turret having a series of testing units thereon, each unit including a chamber having an opening at the top through which the can may be placed in the chamber, and a passage leading to the chamber, means for supplying the chamber with a non-compressible fluid, means for placing the can in said chamber and for closing the chamber, means for subjecting said can to air pressure, and means associated with each chamber for permitting the non-compressible fluid to overflow through said passage and escape during the closing of the chamber, and for cutting off the overflow and trapping the non-compressible fluid displaced from the chamber by air escaping through the leak, and means for utilizing the trapped displaced fluid for causing the leaky can to be ejected from the turret after it is removed from the chamber.

16. A machine for testing cans for leaks including a rotating turret having a series of testing units, each unit including a chamber having an opening at the upper end to receive the can to be tested, a support for the can, a rod carrying said support and extending through the bottom of the chamber, a pad for closing the can and for closing said chamber, an upper cross head supporting the pad, a lower cross head, spaced rods connecting said cross heads, a stationary cam, means carried by the lower cross head and cooperating with said cam for raising and lowering said pad, means actuated by the lower cross head for lowering the rod carrying the support for the can, said last-named means including devices whereby said pad engages the can and closes the same prior to the closing of the chamber, means for subjecting said can to air pressure, and means whereby air escaping through a leak in a can into the chamber may be utilized for causing the ejection of the can from the rotating turret after the can has been withdrawn from the chamber and at a predetermined point in the rotation of the turret.

17. A machine for testing cans for leaks including a rotating turret having a series of testing units, each unit including a chamber having an opening at the upper end to receive the can to be tested, a support for the can, a rod carrying said support and extending through the bottom of the chamber, a pad for closing the can and for closing said chamber, an upper cross head supporting the pad, a lower cross head, spaced rods connecting said cross heads, a stationary cam, means carried by the lower cross head and cooperating with said cam for raising and lowering said pad, means actuated by the lower cross head for lowering the rod carrying the support for the can, said last-named means including devices whereby said pad engages the can and closes the same prior to the closing of the chamber, means for subjecting said can to air pressure, means whereby air escaping through a leak in a can into the chamber may be utilized for causing the ejection of the can from the rotating turret after the can has been withdrawn from the chamber and at a predetermined point in the rotation of the turret, means for feeding the cans in succession and in spaced timed relation to the turret to the testing units, and means for ejecting the perfect cans from the turret at a different point in its rotation from the ejection of the leaky cans.

18. A machine for testing cans for leaks including a rotating turret, a series of testing units carried by said turret, each unit including a chamber having an opening at the top thereof to receive the can, a support for the can, a rod passing centrally through the bottom of said chamber for carrying said support, a half mold guide on said support for centering the can thereon, means for feeding the cans in succession and in timed relation to the rotation of the turret on to said support, and centering the same on the support, a pad for closing the can and for closing the chamber, an upper cross head carrying said pad, a lower cross head connected to said upper cross head, a stationary cam for raising and lowering said cross heads as the turret rotates, for causing said pad to close said chamber, means carried by the lower cross head for retarding the downward movement of the support for the can, whereby said pad engages the can and closes the same prior to the closing of the chamber, said chamber having a passage in the wall thereof, a non-compressible fluid in said chamber, means for connecting said passage to the atmosphere so as to permit the overflow of the non-compressible fluid during the closing of the chamber, and for closing said passage to the atmosphere and connecting the passage to a chamber for receiving and retaining any non-compressible fluid displaced through said passage by air escaping through a leak in a can, means for subjecting said can to air pressure, and means for utilizing the displaced fluid in the chamber for causing the leaky can to be ejected at a predetermined point in the rotation of said turret.

19. A machine for testing cans for leaks including a rotating turret, a series of testing units carried by said turret, each unit including a chamber having an opening at the top thereof to receive the can, a support for the can, a rod passing centrally through the bottom of said chamber for carrying said support, a half mold guide on said support for centering the can thereon, means for feeding the cans in succession and in timed relation to the rotation of the turret on to said support, and centering the same on the support, a pad for closing the can and for closing the chamber, an upper cross head, carrying said pad, a lower cross head connected to said upper cross head, a stationary cam for raising and lowering said cross heads as the turret rotates for causing said pad to close said chamber, means carried by the lower cross head for retarding the downward movement of the support for the can, whereby said pad engages the can and closes the same prior to the closing of the chamber, said chamber having a passage in the wall thereof, a non-compressible fluid in said chamber, means for connecting said passage to the atmosphere so as to permit an overflow of the non-compressible fluid during the closing of the chamber, and for closing said passage to the atmosphere and connecting the passage to a chamber for receiving and retaining any non-compressible fluid displaced through said passage by air escaping through a leak in the can, means for subjecting said can to air pressure, means for utilizing the displaced fluid in the chamber for causing the leaky can to be ejected at a predetermined point in the rotation of said turret, and means for ejecting the perfect cans from the turret at a different point from the leaky cans.

20. A machine for testing cans for leaks including a chamber adapted to contain a liquid in which a can may be placed for testing, means for closing the chamber and for closing the can within the chamber, means for subjecting the can to air pressure, means for maintaining a liquid column having a passage leading to the chamber in which the can is placed for testing, the other end of said column being open to the atmosphere whereby air escaping through a leak in the can into said chamber will change the level of the liquid column, and electrically actuated means controlled by said liquid column for ejecting a leaky can.

In testimony whereof, we affix our signatures.

JAMES H. O'NEIL.
GEORGE FLOOK.